(12) United States Patent
Grover et al.

(10) Patent No.: US 11,619,309 B2
(45) Date of Patent: Apr. 4, 2023

(54) NON-CONTACT SEAL FOR ROTATIONAL EQUIPMENT WITH AXIALLY EXPENDED SEAL SHOES

(71) Applicant: Raytheon Technologies Corporation, Farmington, CT (US)

(72) Inventors: Eric A. Grover, Tolland, CT (US); Jagannath Pranatharthikaran, Vernon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 280 days.

(21) Appl. No.: 17/005,368

(22) Filed: Aug. 28, 2020

(65) Prior Publication Data
US 2022/0065351 A1   Mar. 3, 2022

(51) Int. Cl.
*F16J 15/44*   (2006.01)
*F01D 11/02*   (2006.01)
*F01D 11/16*   (2006.01)
*F02C 7/28*    (2006.01)

(52) U.S. Cl.
CPC ........... *F16J 15/442* (2013.01); *F01D 11/025* (2013.01); *F01D 11/16* (2013.01); *F16J 15/445* (2013.01); *F02C 7/28* (2013.01); *F05D 2240/55* (2013.01)

(58) Field of Classification Search
CPC ...... F16J 15/442; F16J 15/445; F01D 11/025; F01D 11/16; F05D 2240/55; F02C 7/28
See application file for complete search history.

(56) References Cited

U.S. PATENT DOCUMENTS

| | | | |
|---|---|---|---|
| 4,017,088 A | 4/1977 | Lerjen | |
| 4,998,739 A | 3/1991 | Weiler | |
| 6,145,843 A * | 11/2000 | Hwang | F16J 15/442 |
| | | | 277/400 |
| 6,226,975 B1 | 5/2001 | Ingistov | |
| 6,428,009 B2 | 8/2002 | Justak | |

(Continued)

FOREIGN PATENT DOCUMENTS

| | | |
|---|---|---|
| DE | 426658 | 3/1926 |
| DE | 19735932 | 2/1999 |

(Continued)

OTHER PUBLICATIONS

EP search report for EP2193644.8 dated Jan. 31, 2022.

(Continued)

*Primary Examiner* — Vishal A Patel
(74) *Attorney, Agent, or Firm* — Getz Balich LLC

(57) ABSTRACT

An assembly is provided for rotational equipment. This rotational equipment assembly includes a plurality of seal shoes, a seal base, a plurality of spring elements and a secondary seal assembly. The seal shoes are arranged circumferentially about an axial centerline in an annular array. The seal shoes include a first seal shoe. The seal base circumscribes the annular array. The spring elements include a first spring element. The first spring element connects and extends between the first seal shoe and the seal base. The secondary seal assembly is configured to seal a gap between the seal base and the seal shoes. An axial end portion of the first seal shoe projects axially along the axial centerline, in a direction away from the first spring element, beyond the secondary seal assembly.

13 Claims, 12 Drawing Sheets

(56) References Cited

U.S. PATENT DOCUMENTS

| | | | |
|---|---|---|---|
| 7,182,345 B2 | 2/2007 | Justak | |
| 7,410,173 B2 | 8/2008 | Justak | |
| 7,726,660 B2 | 6/2010 | Datta | |
| 8,002,285 B2 | 8/2011 | Justak | |
| 8,172,232 B2 | 5/2012 | Justak | |
| 8,919,781 B2 | 12/2014 | Justak | |
| 9,115,810 B2* | 8/2015 | Bidkar | F16J 15/447 |
| 9,145,785 B2 | 9/2015 | Bidkar | |
| 9,359,908 B2 | 6/2016 | Bidkar | |
| 10,030,531 B2 | 7/2018 | Peters | |
| 10,082,039 B2 | 9/2018 | Hanson | |
| 10,094,232 B2 | 10/2018 | McCaffrey | |
| 10,190,431 B2* | 1/2019 | Bidkar | F16J 15/447 |
| 10,208,615 B2 | 2/2019 | Peters | |
| 10,428,672 B2 | 10/2019 | Peters | |
| 2003/0080513 A1 | 5/2003 | Kirby, III | |
| 2004/0155410 A1* | 8/2004 | Proctor | F16J 15/164 |
| | | | 277/409 |
| 2008/0265513 A1* | 10/2008 | Justak | F01D 11/025 |
| | | | 277/411 |
| 2013/0259660 A1 | 10/2013 | Dale | |
| 2014/0008871 A1 | 1/2014 | Bidkar | |
| 2014/0050564 A1 | 2/2014 | Hagan | |
| 2014/0062024 A1* | 3/2014 | Bidkar | F01D 11/04 |
| | | | 277/303 |
| 2014/0119912 A1 | 5/2014 | Bidkar | |
| 2016/0010480 A1 | 1/2016 | Bidkar | |
| 2016/0102570 A1 | 4/2016 | Wilson | |
| 2016/0109025 A1* | 4/2016 | McCaffrey | F16J 15/445 |
| | | | 277/411 |
| 2016/0115804 A1 | 4/2016 | Wilson | |
| 2016/0115805 A1 | 4/2016 | Gibson | |
| 2016/0130963 A1 | 5/2016 | Wilson | |
| 2017/0211406 A1 | 7/2017 | Peters | |
| 2018/0058240 A1* | 3/2018 | Chuong | F04D 29/321 |
| 2018/0372229 A1 | 12/2018 | Bidkar | |
| 2019/0017403 A1* | 1/2019 | Chuong | F16J 15/442 |
| 2019/0203842 A1 | 7/2019 | Bidkar | |

FOREIGN PATENT DOCUMENTS

| | | | |
|---|---|---|---|
| EP | 1942294 A1 | 7/2008 | |
| EP | 2299062 | 3/2011 | |
| EP | 3196518 A1 * | 7/2017 | F01D 11/025 |
| EP | 3628823 A1 * | 4/2020 | F01D 11/02 |
| JP | S61108808 B1 | 5/1986 | |
| WO | 2008094761 | 8/2008 | |
| WO | 2016179608 | 5/2016 | |

OTHER PUBLICATIONS

Grondahl et al. "Film Riding Leaf Seals for Improved Shaft Sealing", Proceedings of ASME Turbo Expo 2010: Power for Land, Sea and Air, Jun. 14-18, 2010.

* cited by examiner

NON-CONTACT SEAL FOR ROTATIONAL EQUIPMENT WITH AXIALLY EXPENDED SEAL SHOES

BACKGROUND OF THE DISCLOSURE

1. Technical Field

This disclosure relates generally to rotational equipment and, more particularly, to a non-contact seal for rotational equipment.

2. Background Information

Rotational equipment typically includes one or more seal assemblies for sealing gaps between rotors and stators. A typical seal assembly includes a contact seal with a seal element such as a knife edge seal that engages a seal land. Such a contact seal can generate a significant quantity of heat that can reduce efficiency of the rotational equipment as well as subject other components of the rotational equipment to high temperatures and internal stresses. To accommodate these high temperatures and stresses, certain components of the rotational equipment may be constructed from specialty high temperature materials. However, these materials can significantly increase manufacturing and servicing costs as well as mass of the rotational equipment. While non-contact seals have been developed in an effort to reduce heat within rotational equipment, there is still room for improvement to provide an improved non-contact seal. In particular, there is room in the art for a non-contact seal with improved damping characteristics.

SUMMARY OF THE DISCLOSURE

According to an aspect of the present disclosure, an assembly is provided for rotational equipment. This rotational equipment assembly includes a plurality of seal shoes, a seal base, a plurality of spring elements and a secondary seal assembly. The seal shoes are arranged circumferentially about an axial centerline in an annular array. The seal shoes include a first seal shoe. The seal base circumscribes the annular array. The spring elements include a first spring element. The first spring element connects and extends between the first seal shoe and the seal base. The secondary seal assembly is configured to seal a gap between the seal base and the seal shoes. An axial end portion of the first seal shoe projects axially along the axial centerline, in a direction away from the first spring element, beyond the secondary seal assembly.

According to another aspect of the present disclosure, another assembly is provided for rotational equipment. This rotational equipment assembly includes a plurality of seal shoes, a seal base and a plurality of spring elements. The seal shoes are arranged circumferentially around an axial centerline. The seal shoes include a first seal shoe that includes a seal shoe base, one or more inner projections and one or more outer projections. The seal shoe base extends axially along the axial centerline between a first end and a second end. Each of the one or more inner projections extends radially out from the seal shoe base, in an inward direction towards the axial centerline, to a respective unsupported inner projection end. Each of the one or more outer projections extends radially out from the seal shoe base, in an outward direction away from the axial centerline, to a respective unsupported outer projection end. The one or more outer projections are at least partially located axially between the first end and the one or more inner projections. The seal base circumscribes the annular array. The spring elements include a first spring element. The first spring element connects and extends between the first seal shoe and the seal base.

According to still another aspect of the present disclosure, another assembly is provided for rotational equipment. This rotational equipment assembly includes a plurality of seal shoes, a seal base and a plurality of spring elements. The seal shoes are arranged circumferentially around an axial centerline. The seal shoes include a first seal shoe that includes a seal shoe base, one or more inner projections and one or more outer projections. The seal shoe base extends axially along the axial centerline between a high pressure end and a low pressure end. The one or more inner projections extend radially out from the seal shoe base in an inward direction towards the axial centerline. The one or more apertures extend radially through the seal shoe base. The seal base circumscribes the annular array. The spring elements include a first spring element. The first spring element includes a first mount, a second mount and a spring beam. The first mount projects out from the first seal shoe. The second mount projects out from the seal base. The spring beam extends laterally between and is connected to the first mount and the second mount. The one or more apertures are arranged axially between the high pressure end and the first spring element.

The rotational equipment assembly may also include a secondary seal assembly configured to seal a gap between the seal base and the seal shoes. The secondary seal assembly may be configured to axially engage and radially move along a seal land surface of the first seal shoe. The one or more apertures may be arranged axially between the high pressure end and the seal land surface of the first seal shoe.

The first spring element may include a first mount, a second mount and a spring beam. The first mount may be fixedly connected to the first seal shoe. The second mount may be fixedly connected to the seal base. The spring beam may extend laterally between and may be fixedly connected to the first mount and the second mount.

The first seal shoe may also include a seal land extending out from the seal shoe base in the outward direction away from the axial centerline. The one or more outer projections may be arranged axially between the first end and the seal land.

The rotational equipment assembly may also include a secondary seal assembly configured to seal a gap between the seal base and the seal shoes. The secondary seal assembly may be configured to axially engage and radially move along the seal land.

The secondary seal assembly may include a secondary seal device and a ring structure. The secondary seal device may be supported by the ring structure and may movably engage the first seal shoe. The axial end portion of the first seal shoe may project axially along the axial centerline, in the direction away from the first spring element, beyond the ring structure.

The secondary seal device may axially contact and may be configured to radially slide against a seal land surface on an intermediate portion of the first seal shoe.

The ring structure may include a support ring and a retention ring. The support ring may be axially between the seal base and the retention ring. The secondary seal device may be captured axially by and between the support ring and the retention ring. The axial end portion of the first seal shoe may project axially along the axial centerline, in the direction away from the first spring element, beyond the retention ring.

An intermediate portion of the first seal shoe, axially adjacent the axial end portion of the first seal shoe, may be configured with a plurality of arcuate projections. Each of the arcuate projections may project radially inward towards the axial centerline from a base of the first seal shoe.

The axial end portion of the first seal shoe may be configured with a feature adapted to influence dynamic motion of the first seal shoe.

The feature may be one of a plurality of features configured with the axial end portion of the first seal shoe and adapted to influence dynamic motion of the first seal shoe.

The feature may be configured as or otherwise include a projection that projects out from a base of the first seal shoe to an unsupported distal end of the projection.

The feature may be configured as or otherwise include an aperture in a base of the first seal shoe.

The axial end portion of the first seal shoe may be configured with an axially extending rib.

The axial end portion of the first seal shoe may be configured with a circumferentially extending rib.

An aperture may extend radially through the axial end portion of the first seal shoe.

The first spring element may include a first mount, a second mount and a spring beam. The first mount may be connected to the first seal shoe. The second mount may be connected to the seal base. The spring beam may extend laterally between and may be connected to the first mount and the second mount.

The rotational equipment assembly may also include a stationary structure, a rotating structure and a seal assembly. The rotating structure may be configured to rotate about the centerline. The seal assembly may include the seal shoes, the seal base, the spring elements and the secondary seal assembly. The seal assembly may be configured to seal a gap between the stationary structure and the rotating structure. The seal shoes may be arranged circumferentially about and may sealingly engage the rotating structure. The seal base may be mounted to the stationary structure.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
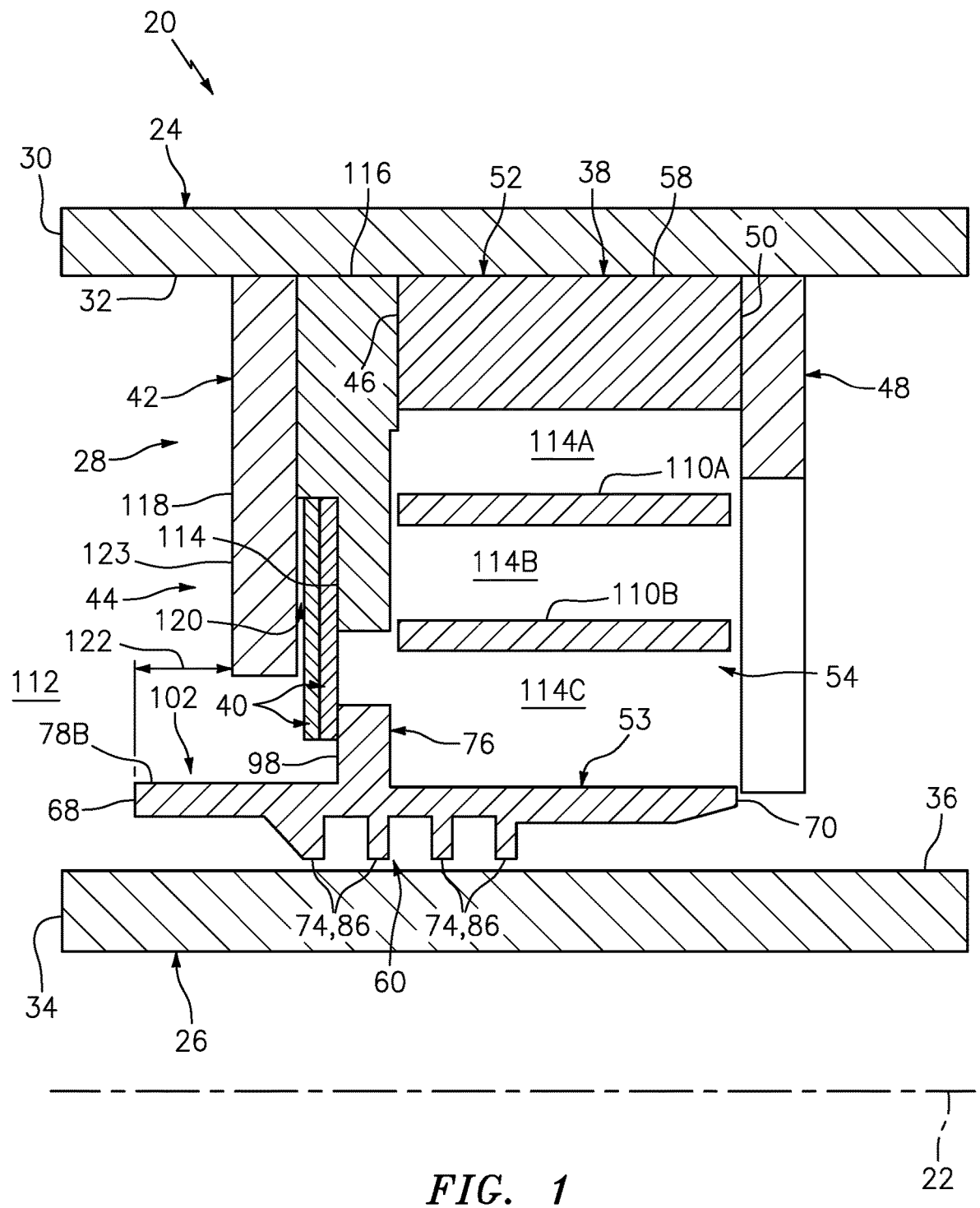
FIG. 1 is a partial side sectional illustration of an assembly for rotational equipment.

FIG. 1 illustrates an assembly 20 for rotational equipment with an axial centerline 22, which centerline 22 may also be an axis of rotation (e.g., a rotational axis) for one or more components of the rotational equipment assembly 20. An example of such rotational equipment is a gas turbine engine for an aircraft propulsion system, an exemplary embodiment of which is described below in further detail (e.g., see FIG. 12). However, the rotational equipment assembly 20 of the present disclosure is not limited to such an aircraft or gas turbine engine application. The rotational equipment assembly 20, for example, may alternatively be configured with rotational equipment such as an industrial gas turbine engine, a wind turbine, a water turbine or any other apparatus in which a seal is provided between a stationary structure and a rotating structure; e.g., a rotor.

The rotational equipment assembly 20 of FIG. 1 includes a stationary structure 24, a rotating structure 26 and a seal assembly 28 such as, for example, an adapting non-contact seal assembly. The seal assembly 28 is mounted with the stationary structure 24 and configured to substantially seal an annular gap between the stationary structure 24 and the rotating structure 26 as described below in further detail.

The stationary structure 24 includes a seal carrier 30. This seal carrier 30 may be a discrete, unitary annular body. Alternatively, the seal carrier 30 may be configured with another component/portion of the stationary structure 24. The seal carrier 30 has a seal carrier inner surface 32. This seal carrier inner surface 32 may be substantially cylindrical. The seal carrier inner surface 32 extends circumferentially about (e.g., completely around) and faces towards the axial centerline 22. The seal carrier inner surface 32 at least partially forms a bore in the stationary structure 24. This bore is sized to receive the seal assembly 28, which seal assembly 28 may be fixedly attached to the seal carrier 30 by, for example, a press fit connection between the seal assembly 28 and the seal carrier inner surface 32. The seal assembly 28, of course, may also or alternatively be fixedly attached to the seal carrier 30 using one or more other techniques/devices.

The rotating structure 26 includes a rotating seal land 34. This rotating seal land 34 may be a discrete, unitary annular body. For example, the rotating seal land 34 may be mounted to a shaft of the rotating structure 26. Alternatively, the rotating seal land 34 may be configured with another component/portion of the rotating structure 26. For example, the rotating seal land 34 may be an integral part of a shaft of the rotating structure 26, or another component mounted to the shaft.

The rotating seal land 34 of FIG. 1 has an outer seal land surface 36. This outer seal land surface 36 may be substantially cylindrical. The outer seal land surface 36 extends circumferentially about (e.g., completely around) and faces away from the axial centerline 22. The outer seal land surface 36 is configured to face towards and may be axially aligned with the seal carrier inner surface 32. While FIG. 1 illustrates the outer seal land surface 36 and the seal carrier inner surface 32 with approximately equal axial lengths along the axial centerline 22, the outer seal land surface 36 may alternatively be longer or shorter than the seal carrier inner surface 32 in other embodiments.

The seal assembly 28 includes a primary seal device 38 and one or more secondary seal devices 40. The seal assembly 28 also includes one or more additional components for positioning, supporting and/or mounting one or more of the seal devices with the stationary structure 24. The seal assembly 28 of FIG. 1, for example, includes a first ring structure 42 configured for positioning, supporting and/or mounting the secondary seal devices 40 relative to the primary seal device 38. The one or more secondary seal devices 40 and the first ring structure 42 may collectively provide a secondary seal assembly 44. The first ring structure 42 may also be configured for axially positioning and/or supporting an axial first side surface 46 of the primary seal device 38 relative to the stationary structure 24.

Figure 2:
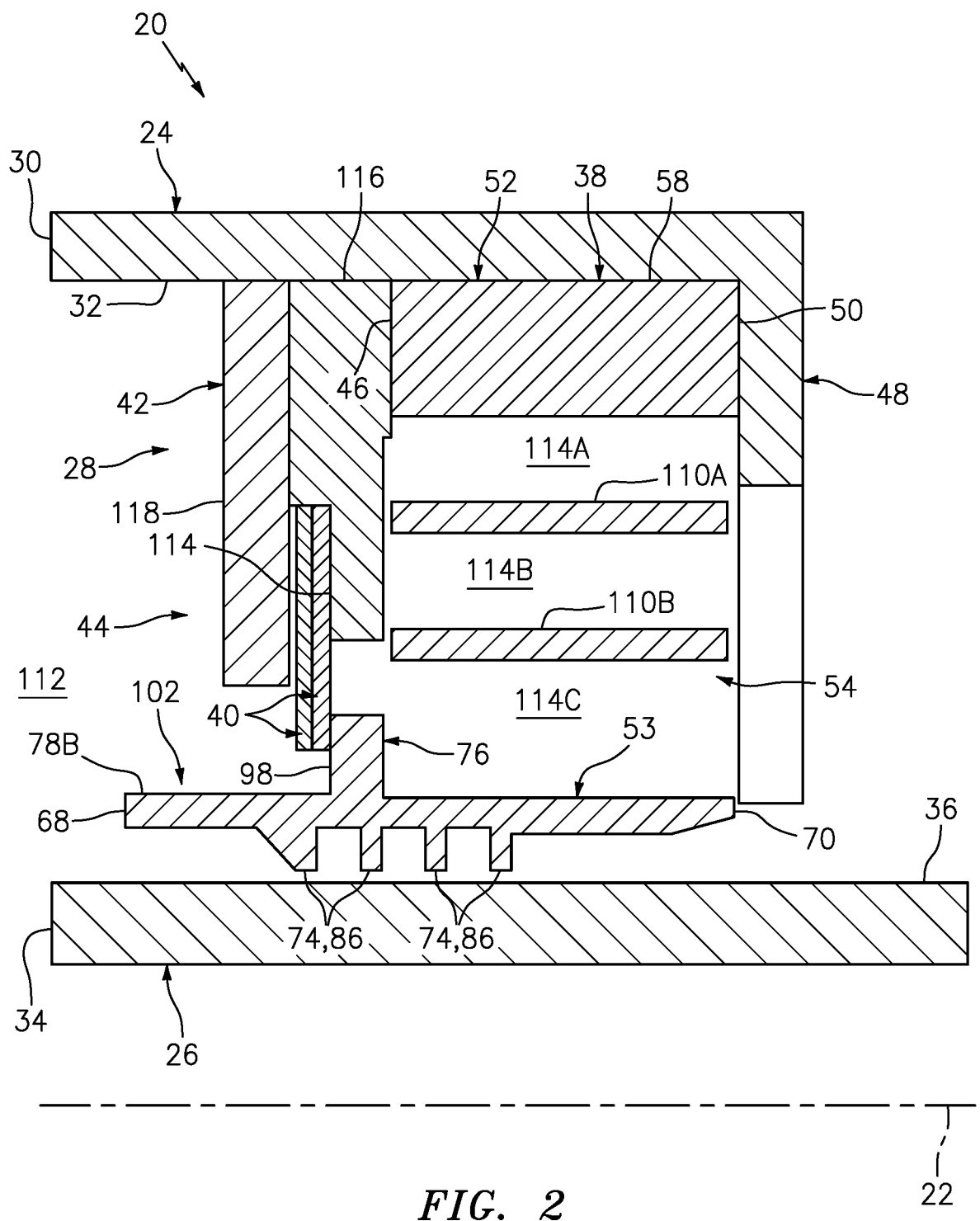
FIG. 2 is a partial side sectional illustration of the assembly configured with another stationary structure.

The seal assembly 28 of FIG. 1 also includes a second ring structure 48 (e.g., a scalloped support ring/plate) configured for axially positioning and/or supporting an axial second side surface 50 of the primary seal device 38 relative to the stationary structure 24. However, the second ring structure 48 may be omitted where, for example, the second side surface 50 of the primary seal device 38 is abutted against another component/portion of the stationary structure 24 (e.g., an annular or castellated shoulder) or otherwise axially positioned/secured with the stationary structure 24; e.g., see FIG. 2.

Figure 3:
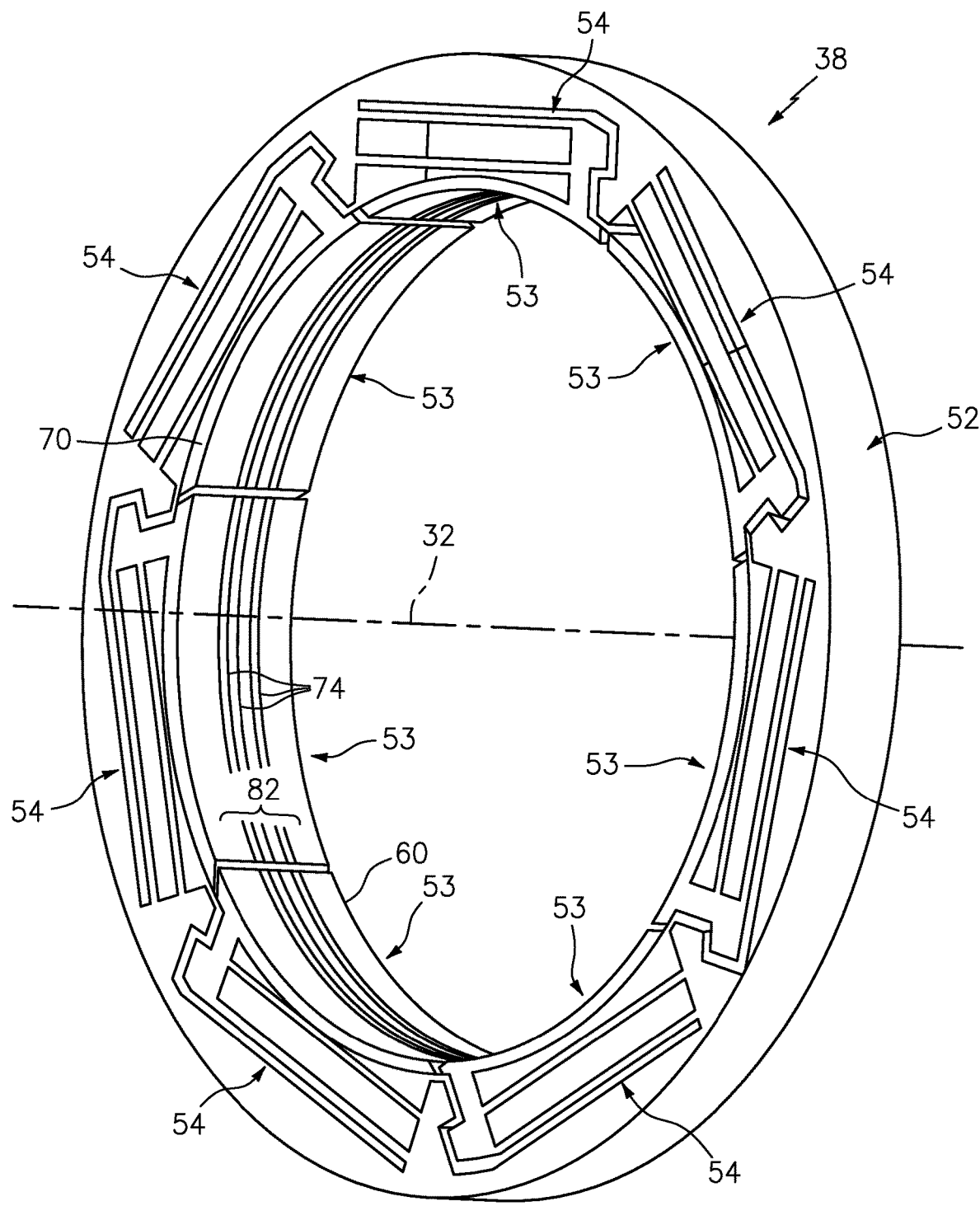
FIG. 3 is a perspective general schematic illustration of a primary seal device for the assembly.

Referring to FIG. 3, the primary seal device 38 is configured as an annular seal device such as, but not limited to, a non-contact hydrostatic seal device. The primary seal device 38 includes a seal base 52, a plurality of seal shoes 53, a plurality of spring elements 54 (see also FIGS. 4 and 5).

Figure 4:
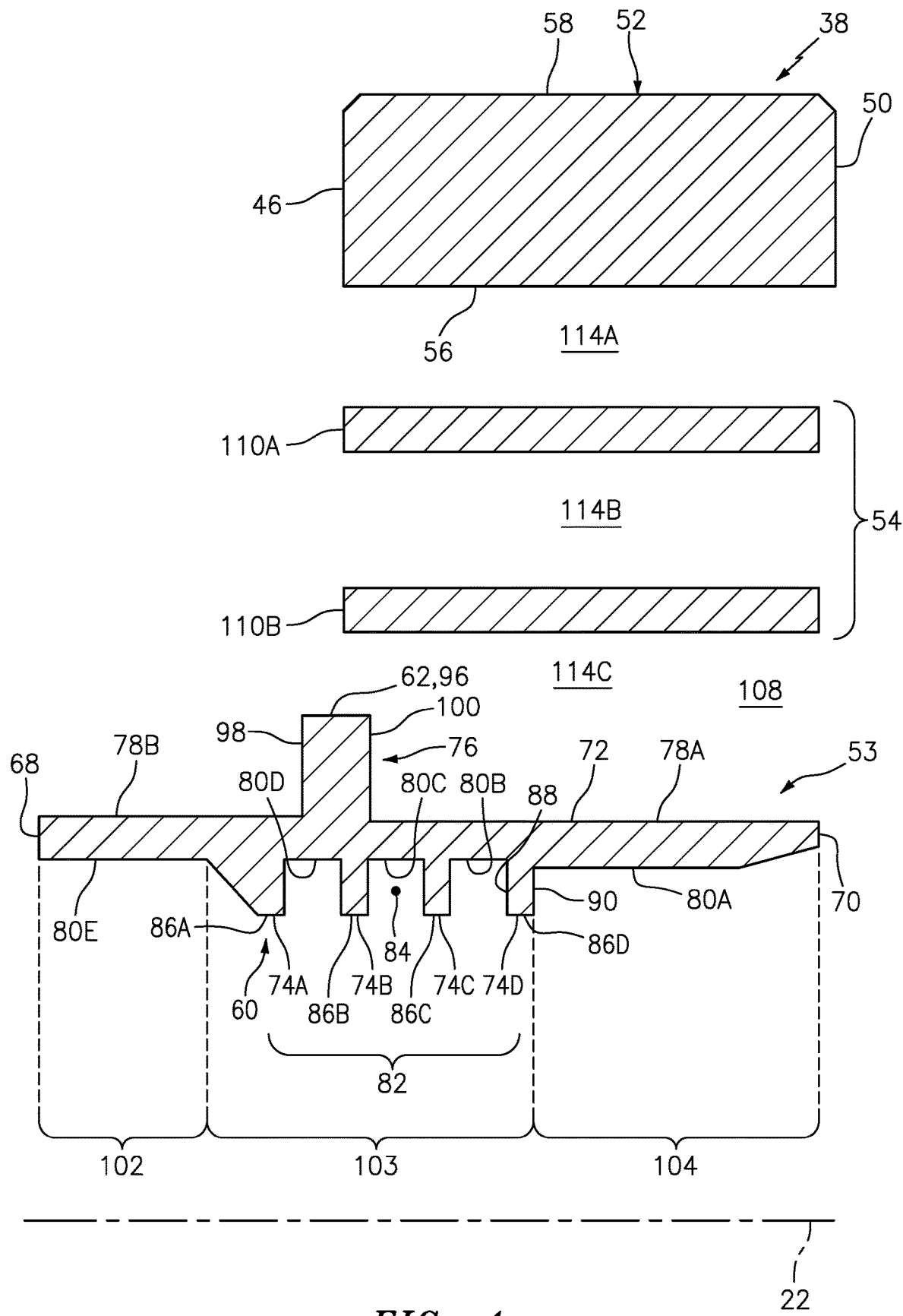
FIG. 4 is a partial side sectional illustration of the primary seal device.

The seal base 52 may be configured as an annular full hoop body. The seal base 52 of FIG. 3 extends circumferentially about (e.g., completely around) the axial centerline 22. The seal base 52 is configured to extend circumferentially around and thereby circumscribe and support the seal shoes 53 as well as the spring elements 54. Referring to FIG. 4, the seal base 52 extends axially along the axial centerline 22 between and forms the first side surface 46 and the second side surface 50. The seal base 52 extends radially between a seal base inner side 56 and a seal base outer side 58. The seal base outer side 58 radially engages (e.g., is press fit against or otherwise contacts) the stationary structure 24 and its inner surface 32 as shown in FIG. 1.

Referring to FIG. 3, the seal shoes 53 may be configured as arcuate bodies and are arranged circumferentially around the axial centerline 22 in an annular array. Each seal shoe 53, for example, is arranged circumferentially between and next to a pair of adjacent circumferentially neighboring seal shoes 53. The annular array of the seal shoes 53 extends circumferentially about (e.g., completely around) the axial centerline 22, thereby forming an inner bore at an inner side 60 of the primary seal device 38. As best seen in FIG. 1, the inner bore is sized to receive the rotating seal land 34, where the rotating structure 26 projects axially through (or into) the inner bore formed by the seal shoes 53.

Figure 5:
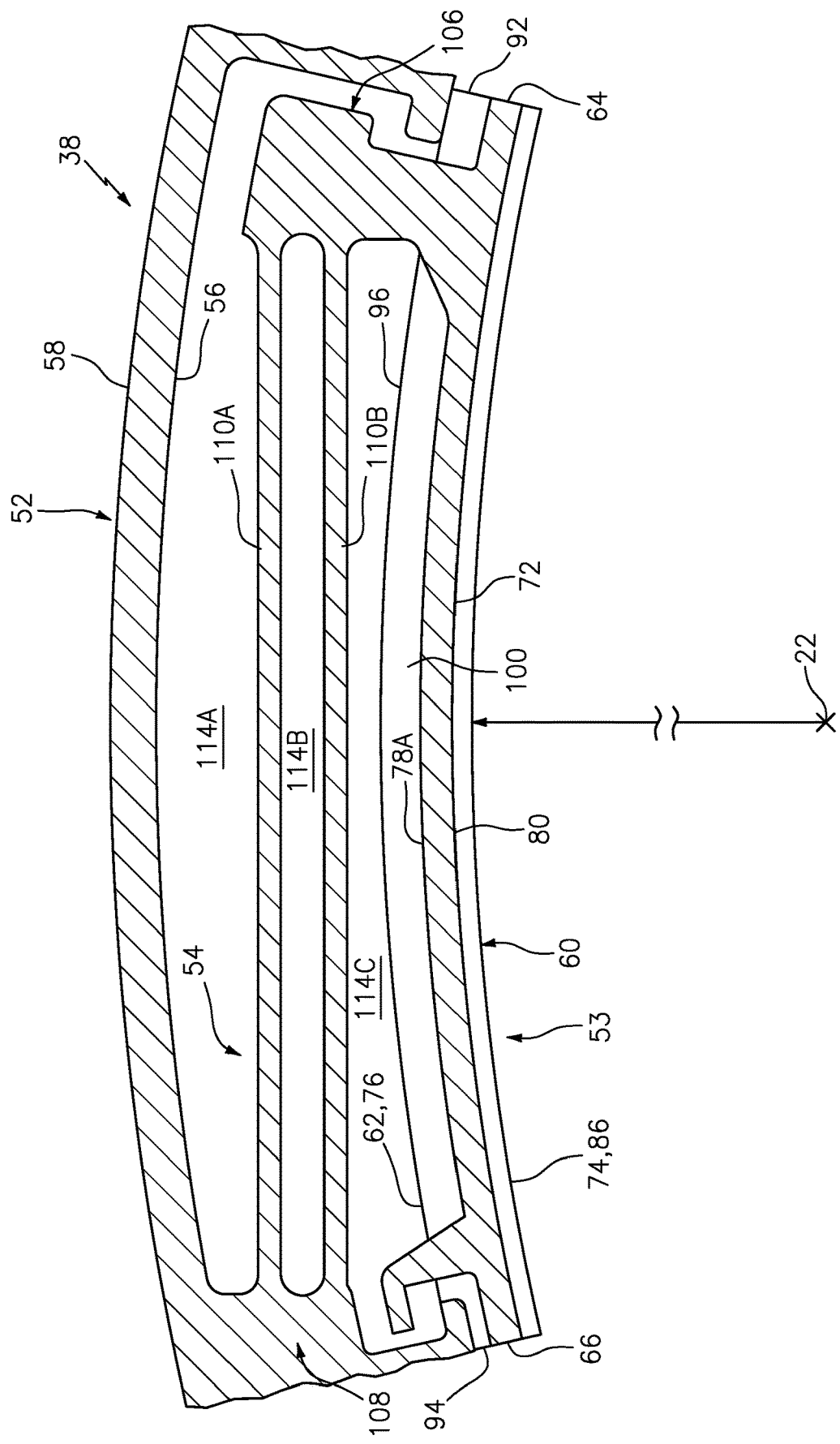
FIG. 5 is a cross-sectional illustration of a portion of the primary seal device.

Referring to FIG. 5, each of the seal shoes 53 extends radially from the inner side 60 of the primary seal device 38 to an outer side 62 of that seal shoe 53. Each of the seal shoes 53 extends circumferentially about the axial centerline 22 between opposing circumferential first and second ends 64 and 66 of that seal shoe 53. Referring to FIG. 4, each of the seal shoes 53 extends axially along the axial centerline 22 between an axial first (e.g., upstream and/or high pressure) end 68 and an axial second (e.g., downstream and/or low pressure) end 70 of the seal shoe 53. The axial seal shoe first end 68 may be an upstream and/or high pressure end relative, for example, to flow of leakage fluid across the primary seal device 38. The axial seal shoe first end 68 is axially offset/displaced from the axial first side surface 46. The axial seal shoe second end 70 may be a downstream and/or low pressure end relative, for example, to the flow of leakage fluid across the primary seal device 38. The axial seal shoe second end 70 may be axially aligned with the axial second side surface 50. The seal shoes 53 of the present disclosure, however, are not limited to such exemplary relationships.

Each of the seal shoes 53 includes a seal shoe base 72 and one or more seal shoe projections 74A-D (generally referred to as "74") (e.g., inner projections such as rails and/or teeth). Each seal shoe 53 of FIG. 4 also includes a (e.g., non-rotating) seal land 76 (e.g., a secondary seal, seal land) for the one or more secondary seal devices 40 (see FIG. 1).

The seal shoe base 72 of FIGS. 4 and 5 includes one or more (e.g., arcuate) base outer surfaces 78A-B (generally referred to as "78") and one or more (e.g., arcuate) base inner surfaces 80A-E (generally referred to as "80"). The seal shoe base 72 extends radially between the one or more base outer surfaces 78 and the one or more base inner surfaces 80. Referring to FIG. 5, the seal shoe base 72 extends circumferentially about the axial centerline 22 between the circumferential seal shoe first end 64 and the circumferential seal shoe second end 66. The seal shoe base 72 includes a first end surface at the circumferential seal shoe first end 64 and a second end surface at the circumferential seal shoe second end 66. Each of the end surfaces may be a flat planar surface. Each of the end surfaces, for example, may have a straight sectional geometry when viewed, for example, in a plane perpendicular to the axial centerline 22; e.g., the plane of FIG. 5. Referring to FIG. 4, the seal shoe base 72 extends axially between the axial seal shoe first end 68 and the axial seal shoe second end 70.

The seal shoe projections 74 are arranged at discrete axial locations along the axial centerline 22 and the seal shoe base 72. Each pair of axially adjacent/neighboring projections 74 may thereby be axially separated by an (e.g., arcuate) inter-projection gap. The seal shoe projections 74 of FIG. 4 are configured parallel to one another.

The seal shoe projections 74 may be arranged in a concentrated grouping 82. This grouping 82 may be asymmetrically arranged axially along the centerline 22 between the axial seal shoe first end 68 and the axial seal shoe second end 70. For example, an axial center 84 (e.g., midpoint) of the grouping 82 of the seal shoe projections 74 in FIG. 4 is arranged closer to the axial seal shoe first end 68 than the axial seal shoe second end 70. The seal shoe projections 74 of the present disclosure, however, are not limited to the foregoing exemplary asymmetric configuration. For example, the axial center 84 of the grouping 82 of the seal shoe projections 74 may alternatively be arranged closer to the axial seal shoe second end 70 than the axial seal shoe first end 68, or still alternatively positioned midway between the axial seal shoe first end 68 and the axial seal shoe second end 70.

The seal shoe projections 74 are connected to (e.g., formed integral with or otherwise attached to) the seal shoe base 72. Each of the seal shoe projections 74 projects radially inwards from the seal shoe base 72 and its base inner surfaces 80 to an unsupported distal projection end.

Each of the seal shoe projections 74 has a projection inner surface 86A-D (generally referred to as "86") at its unsupported distal projection end. One or more or each of the projection inner surfaces 86 may also be at (e.g., on, adjacent or proximate) the inner side 60 of the primary seal device 38. Each projection inner surface 86 may be an arcuate surface. Each projection inner surface 86, for example, may have an arcuate sectional geometry when viewed, for example, in a plane perpendicular to the axial centerline 22; e.g., the plane of FIG. 5. The projection inner surfaces 86 are configured to be arranged in close proximity with (but not touch) and thereby sealingly mate with the outer seal land surface 36 in a non-contact manner (see FIG. 1), where the rotating structure 26 projects axially through (or into) the inner bore formed by the seal shoes 53.

Each of the seal shoe projections 74 extends axially between opposing projection end surfaces (e.g., 88 and 90). Each of these end surfaces extends radially between and may be contiguous with a respective one of the projection inner surfaces (e.g., 86D in FIG. 4) and a respective one of the base inner surfaces (e.g., 80A and 80B in FIG. 4).

Figure 6:
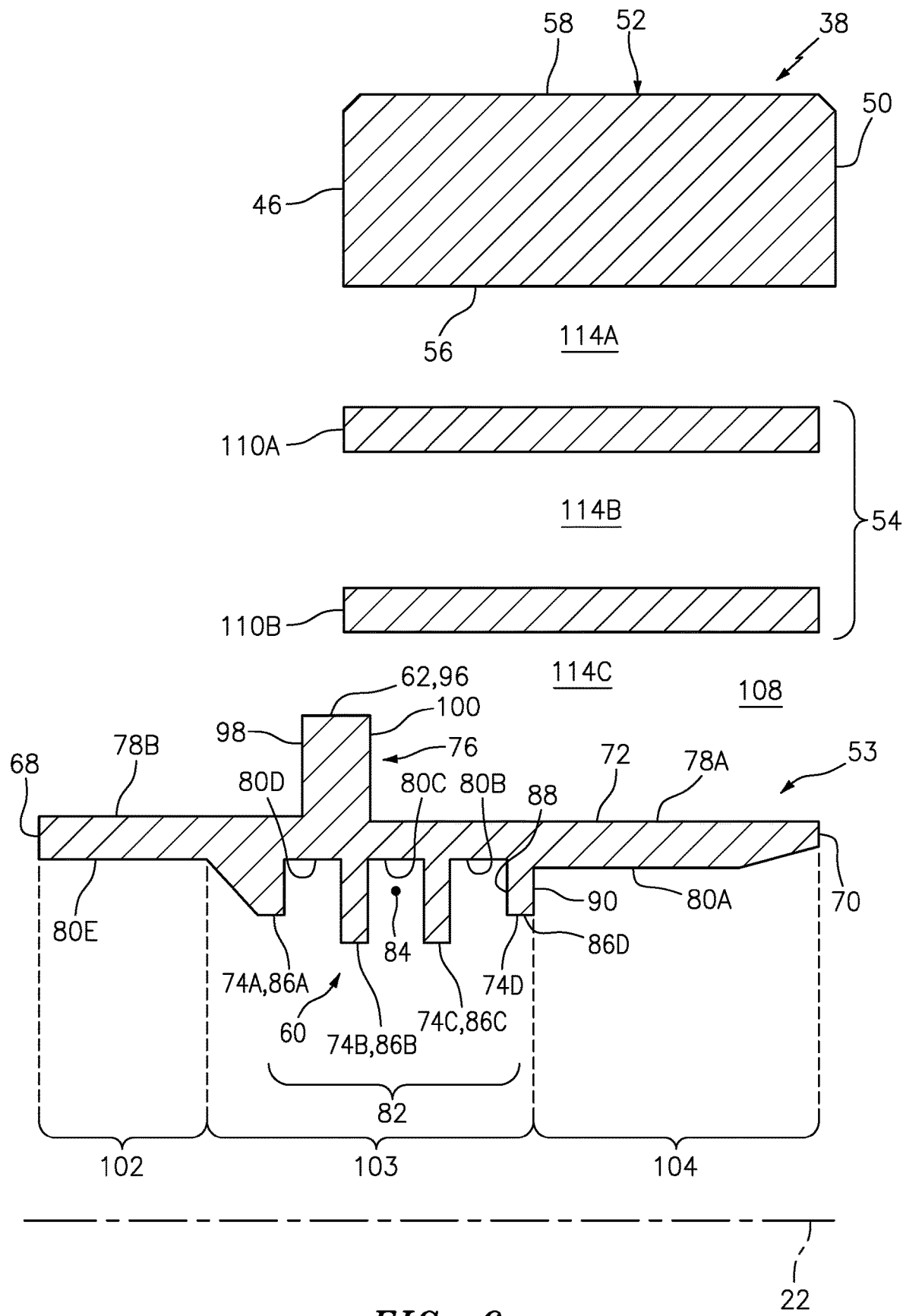
FIG. 6 is a partial side sectional illustration of the primary seal device configured with projections having different radial heights.

Each of the seal shoe projections 74 of FIG. 4 has the same radial height. In other embodiments, however, one or more of the seal shoe projections 74 may have a different radial height than at least another one of the seal shoe projections 74; e.g., see FIG. 6.

Referring to FIG. 5, the seal land 76 extends circumferentially to and between the circumferential seal shoe sides 92 and 94. Referring now to FIG. 4, the seal land 76 projects radially out from the seal shoe base 72 to an unsupported distal seal land end 96 at (e.g., on, adjacent or proximate) the seal shoe outer side 62. The seal land 76 extends axially between opposing (e.g., arcuate) first and second side surfaces 98 and 100. The first side surface 98 is configured as a seal land surface for the one or more secondary seal devices 40 as shown in FIG. 1. More particularly, when the seal shoes 53 are arranged in the array, the first side surfaces 98 collectively form a generally annular, but circumferentially segmented, side surface configured for sealingly engaging with (e.g., contacting) the secondary seal devices 40 as shown in FIG. 1. The seal shoes 53 of the present disclosure, however, are not limited to the foregoing exemplary configuration.

The seal land 76 may be generally axially aligned with and/or axially overlapped by the one or more seal shoe projections 74. The seal land 76 of FIG. 4, for example, is axially aligned with and is axially overlapped by the seal shoe projection 74B. The present disclosure, however, is not limited to such an exemplary arrangement. For example, in other embodiments, the seal land 76 may be axially aligned with any other one of the seal shoe projections (e.g., 74A, 74C and/or 74D). In still other embodiments, the seal land 76 may be axially offset from the seal shoe projections 74. The seal land 76, for example, may be arranged axially upstream of (e.g., towards the end 68) or axially downstream of (e.g., towards the end 70) the one or more seal shoe projections 74/grouping 82. In another example, the seal land 76 may be arranged axially between an adjacent/neighboring pair of seal shoe projections 74 (e.g., 74A and 74B, 74B and 74C, 74C and 74D).

The seal shoe 53 of FIG. 4 is configured with an axial first end portion 102, an axial intermediate portion 103 and an axial second end portion 104. The first end portion 102 is disposed at the axial seal shoe first end 68. The first end portion 102 of FIG. 4, for example, projects axially along the axial centerline 22 out from the intermediate portion 103 to the axial seal shoe first end 68. The intermediate portion 103 extends axially along the axial centerline 22 between (e.g., and to) the first and the second end portions 102 and 104. The intermediate portion 103 of FIG. 4 is configured with the one or more seal shoe projections 74 as well as the seal land 76. The second end portion 104 is disposed at the axial seal shoe second end 70. The second end portion 104 of FIG. 4, for example, projects axially along the axial centerline 22 out from the intermediate portion 103 to the axial seal shoe second end 70.

As best seen in FIG. 4, the first end portion 102 is cantilevered from the intermediate portion 103. Thus, other than through the intermediate portion 103, the first end portion 102 is otherwise unsupported by another element and/or device. By contrast, as generally shown in FIGS. 4 and 5 and described below in further detail, the intermediate portion 103 and/or the second end portion 104 are each supported by a respective one of the spring elements 54.

Referring to FIG. 3, the spring elements 54 are arranged circumferentially about the axial centerline 22 in an annular array. Referring to FIGS. 4 and 5, the spring elements 54 are also arranged (e.g., radially) between the seal shoes 53 and the seal base 52. Each of the spring elements 54 is configured to moveably and resiliently connect a respective one of the seal shoes 53 to the seal base 52.

The spring element 54 of FIG. 5 includes first and second mounts 106 and 108 (e.g., inner and outer radial fingers/projections) and one or more spring beams 110A and 110B (generally referred to as "110"). The first mount 106 may be directly or indirectly connected to (e.g., formed integral with or otherwise attached to) a respective one of the seal shoes 53 and each of its portions 103 and/or 104 at (e.g., on, adjacent or proximate) the circumferential seal shoe first end 64, where the opposing circumferential seal shoe second end 66 is free floating (e.g., the seal shoe 53 is cantilevered from the first mount 106). The first mount 106 projects radially outward from the seal shoe base 72 and each of its portions 103 and/or 104.

The second mount 108 may be directly or indirectly connected to the seal base 52, and is generally circumferentially aligned with or near the circumferential seal shoe second end 66. The second mount 108 is therefore disposed a circumferential distance from the first mount 106. The second mount 108 projects radially inward from the seal base 52.

The spring beams 110 are configured as resilient, biasing members of the primary seal device 38. The spring beams 110 of FIG. 5, for example, are configured as cantilevered-leaf springs. These spring beams 110 may be radially stacked and spaced apart from one another so as to form a four bar linkage with the first mount 106 and the second mount 108. More particularly, each of the spring beams 110 may be directly or indirectly connected to the first mount 106 and the second mount 108. Each of the spring beams 110 extends laterally (e.g., circumferentially or tangentially) between and to the first mount 106 and the second mount 108. The spring beams 110 of FIG. 5 may thereby laterally overlap a major circumferential portion (e.g., —65-95%) of the respective seal shoe 53.

During operation of the primary seal device 38 of FIG. 1, rotation of the rotating structure 26 may develop aerodynamic forces and apply a fluid pressure to the seal shoes 53 causing each seal shoe 53 to respectively move radially up and down relative to the outer seal land surface 36. The fluid velocity may increase as a gap between a respective seal shoe 53 and the outer seal land surface 36 increases, thus reducing pressure in the gap and drawing the seal shoe 53 radially inwardly toward the outer seal land surface 36. As the gap closes, the velocity may decrease and the pressure may increase within the gap, thus, forcing the seal shoe 53 radially outwardly from the outer seal land surface 36. The respective spring element 54 and its spring beams 110 may deflect and move with the seal shoe 53 to enable provision of a primary seal of the gap between the outer seal land surface 36 and seal shoe projections 74 within predetermined design tolerances.

To regulate and/or reduce vibratory up and down movement of the seal shoes 53, the first end portion 102 of each seal shoe 53 may be elongated in an axial direction away from the respective spring element 54. For example, by increasing surface area (e.g., area of surface 78B) of the seal shoe 53 at (e.g., on, adjacent or proximate) the axial seal shoe first end 68 where the fluid pressure is the greatest, the interaction between motion of the seal shoe 53 and time-varying pressures acting upon the seal shoe 53 may be more favorably aligned to provide improved seal shoe damping; e.g., positive seal shoe damping. More particularly, by increasing surface area of the first end portion 102, the relatively high pressure fluid (e.g., compressed gas) in a plenum 112 upstream of the seal assembly 28 and adjacent the first end portion 102 has larger surface(s) on which to act.

While the primary seal device 38 described above is operable to generally seal the annular gap between the stationary structure 24 and the rotating structure 26, the fluid (e.g., gas) may still flow axially through passages 114A-C (generally referred to as "114") defined by radial air gaps between the elements 52, 53 and 114. The secondary seal assembly 44 and its one or more secondary seal devices 40 therefore are provided to seal off these passages 114 and, thereby, further and more completely seal the annular gap.

Each of the secondary seal devices 40 may be configured as a ring seal element such as, but not limited to, a split ring. Alternatively, one or more of the secondary seal devices 40 may be configured as a full hoop body ring, an annular brush seal or any other suitable ring-type seal.

The secondary seal devices 40 of FIG. 1 are arranged together in an axial stack. In this stack, each of the secondary seal devices 40 axially engages (e.g., contacts) another adjacent one of the secondary seal devices 40. The stack of the secondary seal devices 40 is arranged with the first ring structure 42, which positions and mounts the secondary seal devices 40 with the stationary structure 24 adjacent the primary seal device 38. In this arrangement, the stack of the secondary seal devices 40 is operable to axially engage (e.g., contact) and form a seal between one or more or each of the first side surfaces 98 of the seal shoes 53 and an annular surface 114 of the first ring structure 42. These surfaces 98 and 114 are axially aligned with one another, which enables the stack of the secondary seal devices 40 to slide radially against, but maintain a seal engagement with, one or more or each of the seal lands 76 and their side surfaces 98 as the seal shoes 53 move radially relative to the outer seal land surface 36 as described above.

The first ring structure 42 may include a secondary seal device support ring 116 and a retention ring 118. The support ring 116 is configured with an annular full hoop body, which extends circumferentially around the axial centerline 22. The support ring 116 includes the annular surface 114, and is disposed axially adjacent and engaged with (e.g., axially contacts, abutted against) the seal base 52.

The retention ring 118 is configured with an annular full hoop body, which extends circumferentially around the axial centerline 22. The retention ring 118 is disposed axially adjacent and is engaged with (e.g., axially contacts, abutted against) the support ring 116, thereby capturing the stack of the secondary seal devices 40 within an annular channel 120 formed between the rings 116 and 118. The stack of the secondary seal devices 40, of course, may also or alternatively be attached to one of the rings by, for example, a press fit connection and/or otherwise.

In some embodiments, the first end portion 102 of one or more or each seal shoe 53 projects axially along the axial centerline 22, in the direction away from the respective spring element 54, along and/or beyond (e.g., an entirety of) the secondary seal assembly 44. For example, the first end portion 102 may project axially past the one or more secondary seal devices 40 and/or the first ring structure 42 and/or one or more of the first ring structure elements 116 and 118. With this arrangement, the axial seal shoe first end 68 is axially offset/displaced from the secondary seal assembly 44 and its axially closest surface (e.g., surface 123) by a non-zero axial distance 122.

In some embodiments, referring to FIGS. 7-11, the first end portion 102 of one or more or each of the seal shoes 53 may be configured with one or more tuning features 124 adapted to influence dynamic motion of that respective seal shoe 53. Each feature 124 may influence the dynamic motion of the respective seal shoe 53 by tuning damping provided by the first end portion 102 for the seal shoe 53. One or more or each of the features 124, for example, may be configured as a protrusion that increases the mass and/or exposed surface area of the first end portion 102. One or more or each of the features 124 may also or alternatively be configured as an aperture (e.g., a through-hole, a channel, a notch, a recession, etc.) that decreases the mass and/or exposed surface area of the first end portion 102.

Figure 7:
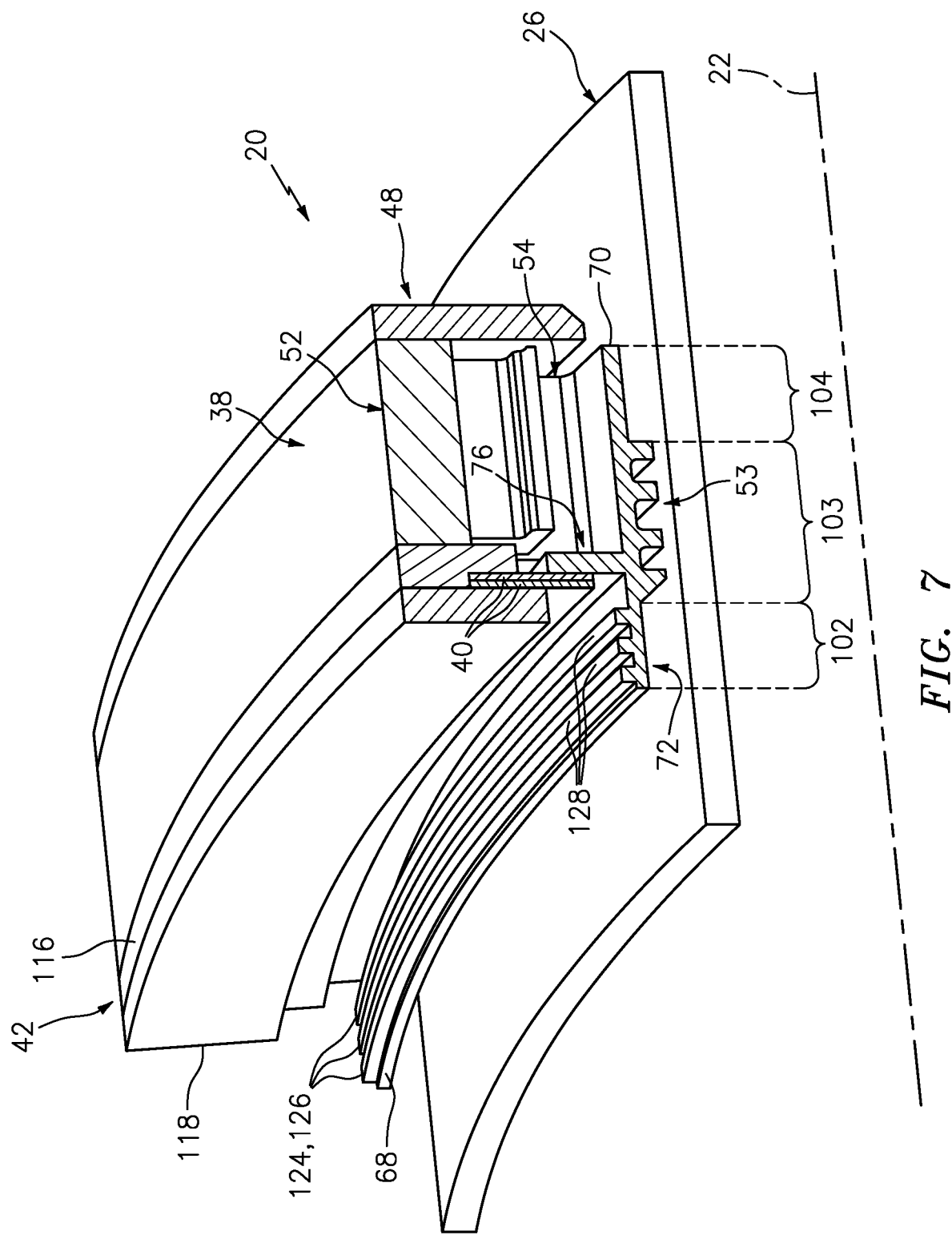
FIGS. 7-11 are partial perspective side sectional illustration of the assembly with various different seal shoe features.

Referring to FIG. 7, the first end portion 102 is configured with one or more circumferentially extending ribs 126. Each of these ribs 126 extends circumferentially between (e.g., and to) the circumferential seal shoe ends 64 and 66 (see FIG. 5). Each of the ribs 126 may be an outer rib as shown in FIG. 7. More particularly, each of the ribs 126 may project radially out from the seal shoe base 72, in a radial outward direction away from the axial centerline 22, to a respective unsupported distal rib end 128. However, in other embodiments, at least one (or more or each) of the ribs 126 (e.g., inner ribs) may project radially out from the seal shoe base 72, in a radial inward direction towards the axial centerline 22, to its respective unsupported distal rib end 128 as shown, for example, in FIGS. 8 and 9.

Figure 8:
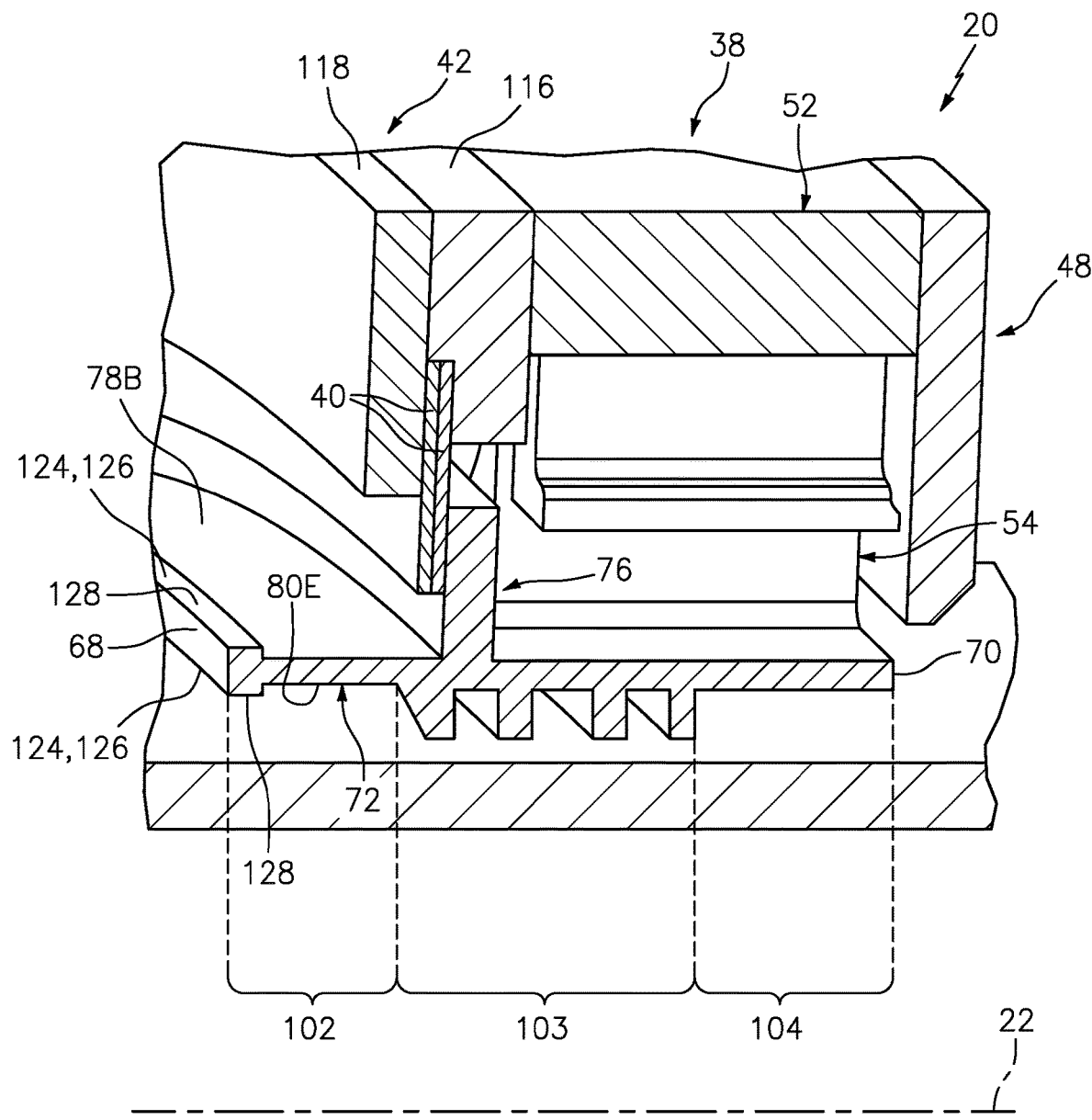
Figure 9:
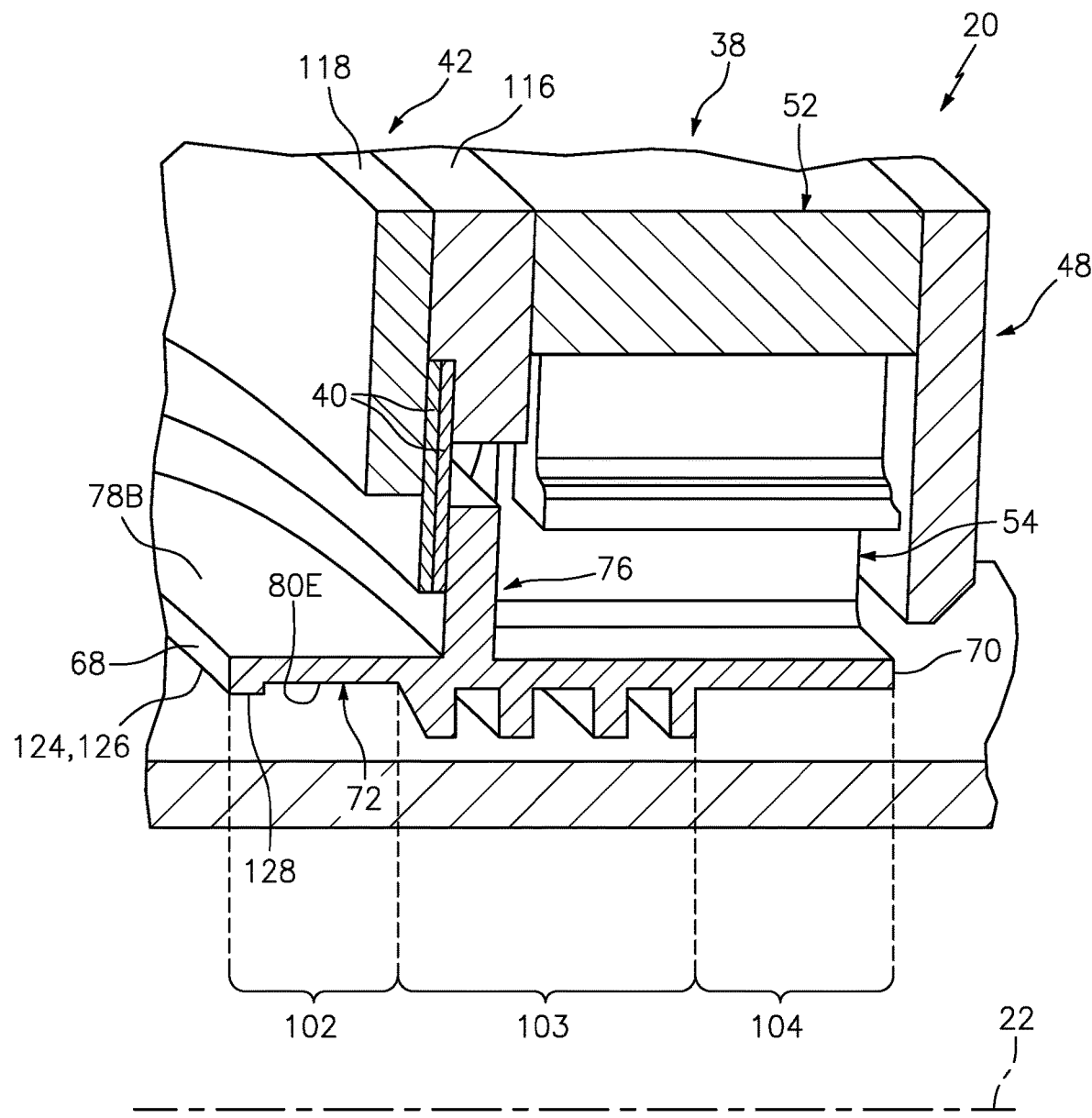

In some embodiments, referring to FIG. 7, the ribs 126 may be arranged at discrete locations along the axial centerline 22 and the seal shoe base 72. However, in other embodiments, a plurality of the ribs 126 may be axially aligned as shown, for example, in FIG. 8. In the embodiments of FIGS. 8 and 9, each rib 126 is located at the axial seal shoe first end 68. Of course, in other embodiments, each rib 126 may be axially displaced from the axial seal shoe first end 68 by a non-zero distance.

Figure 10:
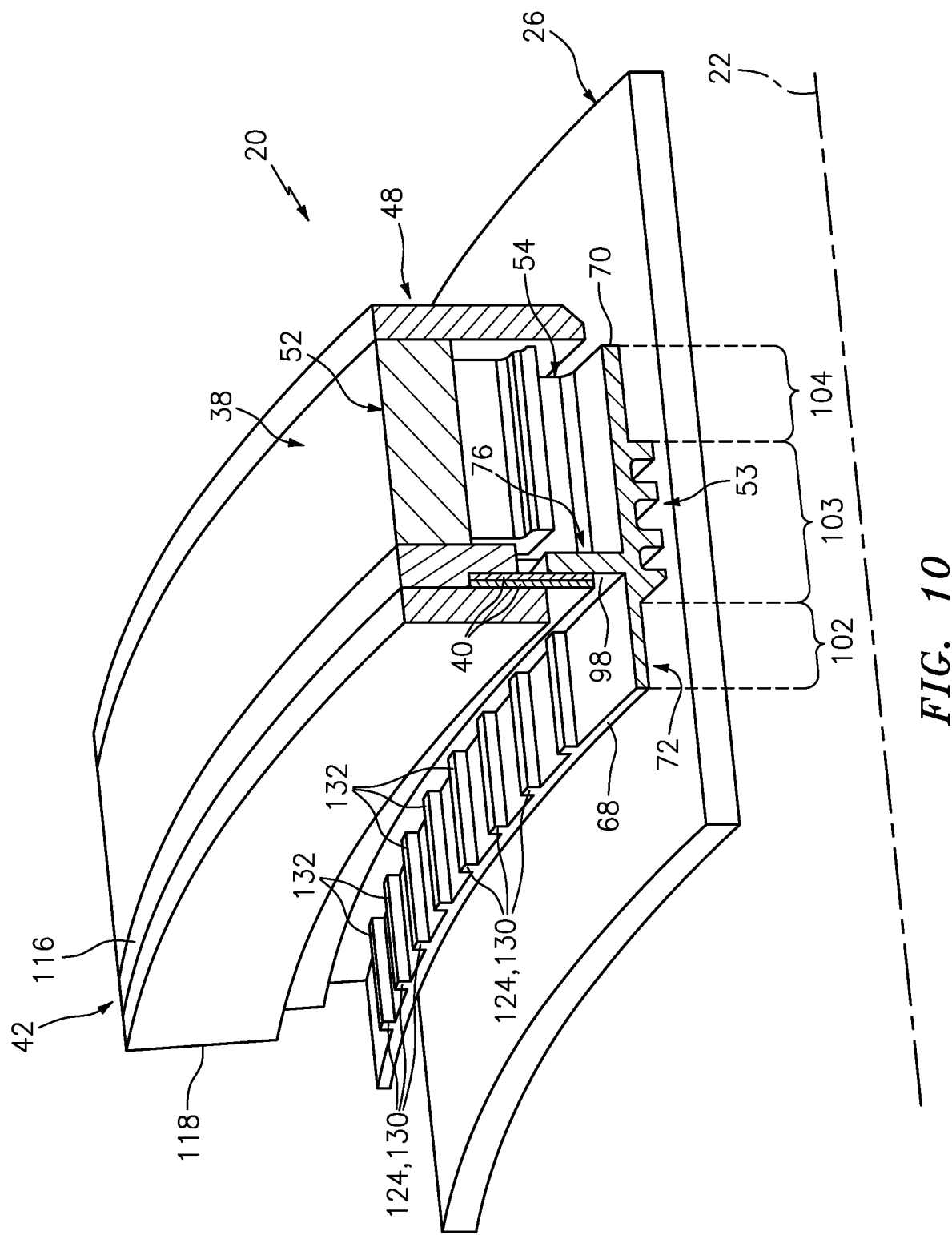

Referring to FIG. 10, the first end portion 102 may alternatively (or also) be configured with one or more axially extending ribs 130. Each of these ribs 130 extends axially between (e.g., and to) the axial seal shoe first end 68 and the first side surface 98. Each of the ribs 130 may be an outer rib as shown in FIG. 10. More particularly, each of the ribs 130 may project radially out from the seal shoe base 72, in the radial outward direction away from the axial centerline 22, to a respective unsupported distal rib end 132. However, in other embodiments, one or more or each of the ribs 130 (e.g., inner ribs) may project radially out from the seal shoe base 72, in the radial inward direction towards the axial centerline 22, to its respective unsupported distal rib end 132 (not shown).

In some embodiments, referring to FIG. 10, the ribs 130 may be arranged at discrete locations circumferentially about the axial centerline 22 and the seal shoe base 72. The present disclosure, however, is not limited to such an exemplary arrangement. For example, in other embodiments, the ribs 130 may be aligned as generally described with the ribs 126 in FIG. 8.

Figure 11:
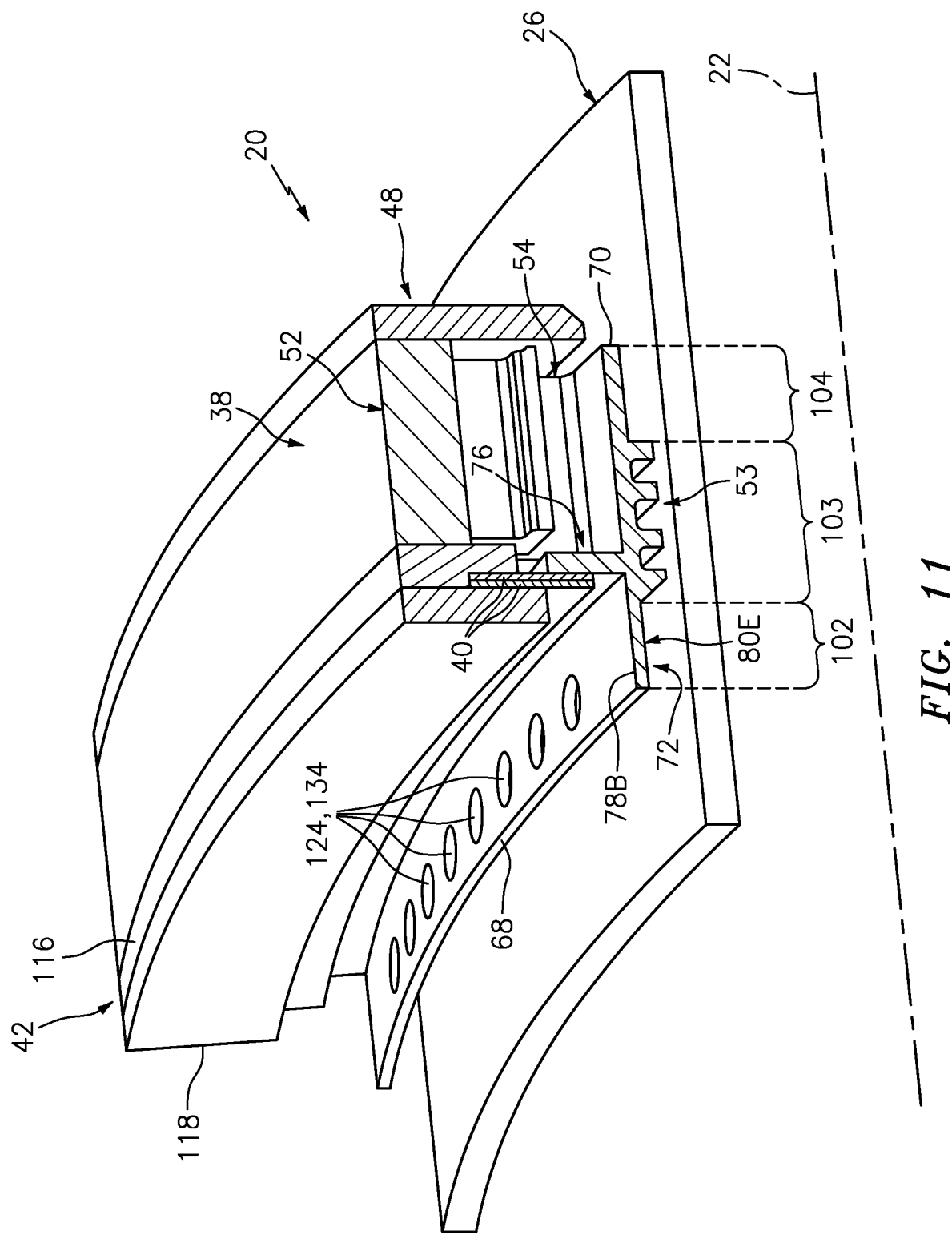

Referring to FIG. 11, the first end portion 102 may alternatively (or also) be configured with one or more apertures 134; e.g., a through-hole, a channel, a notch, a recession, etc. One or more or each of these apertures 134 may extend radially through the seal shoe base 72 between and to the opposing surfaces (e.g., 78B and 80E). One or more or each of the apertures 134 may extend axially within (or alternatively partially into) the seal shoe base 72. One or more or each of the apertures 134 may also or alternatively extend circumferentially within (or alternatively partially into or through) the seal shoe base 72. While each of the apertures 134 is shown as extending completely radially through the first end portion 102 and the seal shoe base 72, one or more or each of the apertures 134 may alternatively extend partially radially into the first end portion 102 and the seal shoe base 72 from the surface (e.g., 78B or 80E).

In some embodiments, referring to FIG. 11, the apertures 134 may be arranged at discrete locations circumferentially about the axial centerline 22 and the seal shoe base 72. The present disclosure, however, is not limited to such an exemplary arrangement. For example, in other embodiments, the apertures 134 may also or alternatively be axially displaced, etc.

In some embodiments, the first end portion 102 may be configured with various different types of the features 124. For example, the first end portion 102 may be configured a combination of any two or more of the features 126, 130 and/or 134 described above. Of course, in still other embodiments, the first end portion 102 may also or alternatively be configured with one or more other types of features 124.

In some embodiments, as best seen in FIGS. 4 and 5, the primary seal device 38 and some or all of its elements (e.g., 52-54) may be configured as a monolithic body. However, the present disclosure is not limited to such a primary seal device construction.

Figure 12:
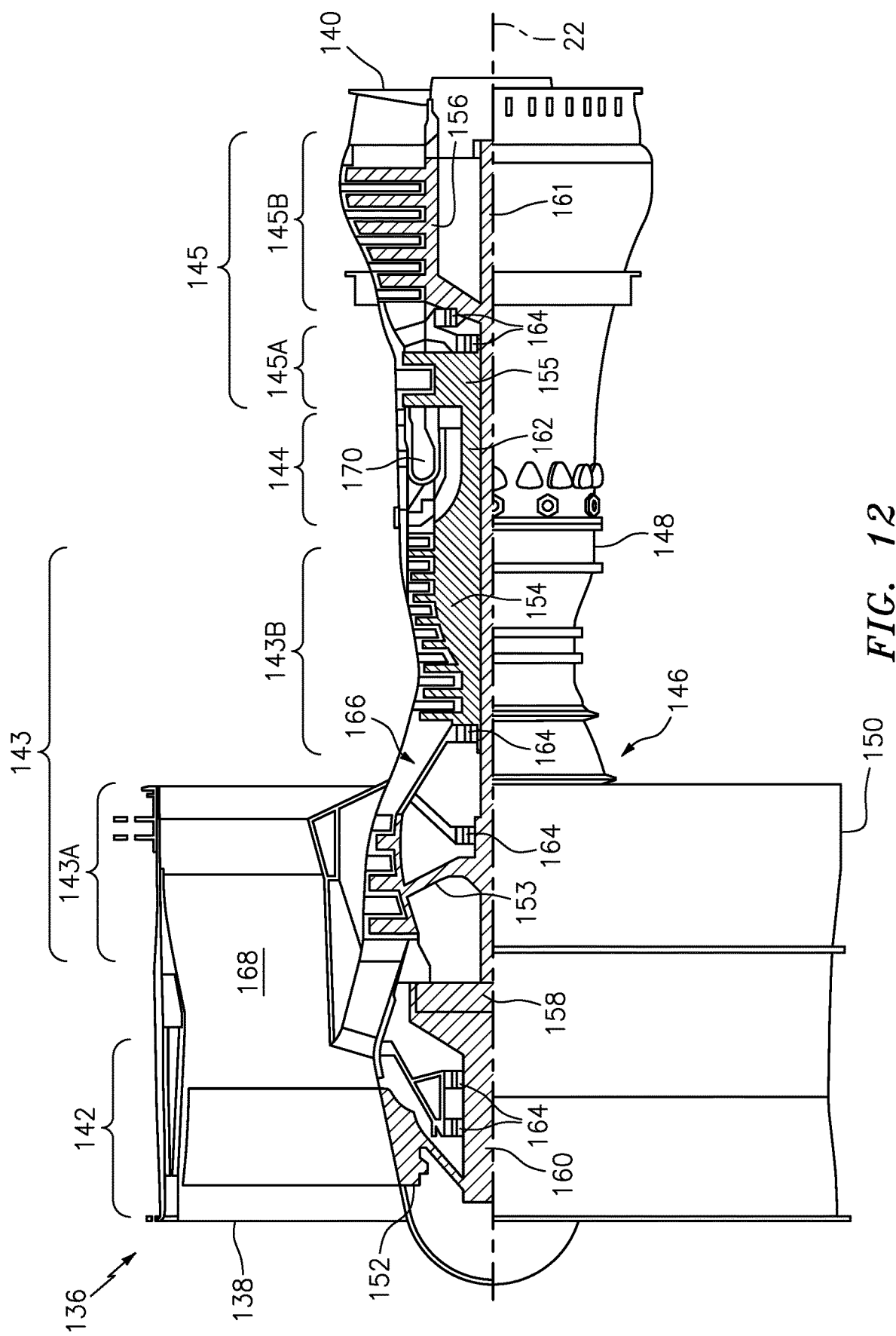
FIG. 12 is a side cutaway illustration of a gas turbine engine which may include the assembly.

As described above, the rotational equipment assembly 20 of the present disclosure may be configured with various different types and configurations of rotational equipment. FIG. 12 illustrates one such type and configuration of the rotational equipment—a geared turbofan gas turbine engine 136. Such a turbine engine includes various stationary structures (e.g., bearing supports, hubs, cases, etc.) as well as various rotors (e.g., rotor disks, shafts, shaft assemblies, etc.) as described below, where the stationary structure 24 and the rotating structure 26 can respectively be configured as anyone of the foregoing structures in the turbine engine 136 of FIG. 12, or other structures not mentioned herein.

The turbine engine 136 of FIG. 12 extends along the axial centerline 22 between an upstream airflow inlet 138 and a downstream airflow exhaust 140. The turbine engine 136 includes a fan section 142, a compressor section 143, a combustor section 144 and a turbine section 145. The compressor section 143 includes a low pressure compressor (LPC) section 143A and a high pressure compressor (HPC) section 143B. The turbine section 145 includes a high pressure turbine (HPT) section 145A and a low pressure turbine (LPT) section 145B.

The engine sections 142-145B are arranged sequentially along the axial centerline 22 within an engine housing 146. This engine housing 146 includes an inner case 148 (e.g., a core case) and an outer case 150 (e.g., a fan case). The inner case 148 may house one or more of the engine sections 143A-145B; e.g., an engine core. The outer case 150 may house at least the fan section 142.

Each of the engine sections 142, 143A, 143B, 145A and 145B includes a respective rotor 152-156. Each of these rotors 152-156 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 152 is connected to a gear train 158, for example, through a fan shaft 160. The gear train 158 and the LPC rotor 153 are connected to and driven by the LPT rotor 156 through a low speed shaft 161. The HPC rotor 154 is connected to and driven by the HPT rotor 155 through a high speed shaft 162. The shafts 160-162 are rotatably supported by a plurality of bearings 164. Each of these bearings 164 is connected to the engine housing 146 by at least one stationary structure such as, for example, an annular support strut.

During operation, air enters the turbine engine 136 through the airflow inlet 138. This air is directed through the fan section 142 and into a core gas path 166 and a bypass gas path 168. The core gas path 166 extends sequentially through the engine sections 143A-145B. The air within the core gas path 166 may be referred to as "core air". The bypass gas path 168 extends through a bypass duct, which bypasses the engine core. The air within the bypass gas path 168 may be referred to as "bypass air".

The core air is compressed by the compressor rotors 153 and 154 and directed into a combustion chamber 170 of a combustor in the combustor section 144. Fuel is injected into the combustion chamber 170 and mixed with the compressed core air to provide a fuel-air mixture. This fuel air mixture is ignited and combustion products thereof flow through and sequentially cause the turbine rotors 155 and 156 to rotate. The rotation of the turbine rotors 155 and 156 respectively drive rotation of the compressor rotors 154 and 153 and, thus, compression of the air received from a core airflow inlet. The rotation of the turbine rotor 156 also drives rotation of the fan rotor 152, which propels bypass air through and out of the bypass gas path 168. The propulsion of the bypass air may account for a majority of thrust generated by the turbine engine 136, e.g., more than seventy-five percent (75%) of engine thrust. The turbine engine 136 of the present disclosure, however, is not limited to the foregoing exemplary thrust ratio.

The rotational equipment assembly 20 may be included in various turbine engines other than the one described above as well as in other types of rotational equipment. The rotational equipment assembly 20, for example, may be included in a geared turbine engine where a gear train connects one or more shafts to one or more rotors in a fan section, a compressor section and/or any other engine section. Alternatively, the rotational equipment assembly 20 may be included in a turbine engine configured without a gear train. The rotational equipment assembly 20 may be included in a geared or non-geared turbine engine configured with a single spool, with two spools (e.g., see FIG. 12), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines or rotational equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for rotational equipment, comprising:
a plurality of seal shoes arranged circumferentially about an axial centerline in an annular array, the plurality of seal shoes comprising a first seal shoe, and the first seal shoe including a seal shoe base, a seal land and a projection axially spaced from the seal land;
a seal base circumscribing the annular array;
a plurality of spring elements comprising a first spring element, the first spring element connecting and extending between the first seal shoe and the seal base; and
a secondary seal assembly configured to seal a gap between the seal base and the plurality of seal shoes, the secondary seal assembly comprising a secondary seal device;
wherein the seal shoe base extends axially along the axial centerline between a first end of the first seal shoe and a second end of the first seal shoe, the seal shoe base includes a first end portion, a second end portion and an intermediate portion axially between the first end portion and the second end portion;
wherein the first end portion projects axially along the axial centerline out from the intermediate portion, in a direction away from the first spring element, beyond the secondary seal assembly to the first end of the first seal shoe;
wherein the second end portion projects axially along the axial centerline out from the intermediate portion to the second end of the first seal shoe;
wherein the seal land projects radially out from the intermediate portion in a direction away from the axial centerline;
wherein the projection projects radially out from the first end portion base in the direction away from the axial centerline to an unsupported distal end of the projection; and
wherein the secondary seal device axially engages the seal land, and the secondary seal device is arranged axially between the seal land and the projection.

2. The assembly of claim 1, wherein
the secondary seal assembly further comprises a ring structure; and
the secondary seal device is supported by the ring structure.

3. The assembly of claim 1, wherein the secondary seal device axially contacts and is configured to radially slide against a surface of the seal land.

4. The assembly of claim 2, wherein
the ring structure comprises a support ring and a retention ring;
the support ring is axially between the seal base and the retention ring; and
the secondary seal device is captured axially by and between the support ring and the retention ring.

5. The assembly of claim 1, wherein
the intermediate portion of the first seal shoe is configured with a plurality of arcuate projections; and each of the plurality of arcuate projections projects radially inward towards the axial centerline from a base of the seal shoe base.

6. The assembly of claim 1, wherein the projection is adapted to influence dynamic motion of the first seal shoe.

7. The assembly of claim 1, wherein
the first spring element includes a first mount, a second mount and a spring beam;
the first mount is connected to the first seal shoe;
the second mount is connected to the seal base; and
the spring beam extends laterally between and is connected to the first mount and the second mount.

8. The assembly of claim 1, further comprising:
a stationary structure;
a rotating structure configured to rotate about the centerline; and
a seal assembly including the plurality of seal shoes, the seal base, the plurality of spring elements and the secondary seal assembly, the seal assembly configured to seal a gap between the stationary structure and the rotating structure;
wherein the plurality of seal shoes are arranged circumferentially about and sealingly engage the rotating structure; and
wherein the seal base is mounted to the stationary structure.

9. The assembly of claim 1, wherein
the first end portion further includes a second projection; and
the second projection projects radially out from the seal shoe base to an unsupported distal end of the second projection.

10. The assembly of claim 9, wherein
the projection comprises a first circumferentially extending rib; and
the second projection comprises a second circumferentially extending rib located axially between the first circumferentially extending rib and the first end of the first seal shoe.

11. An assembly for rotational equipment, comprising:
a plurality of seal shoes arranged circumferentially about an axial centerline in an annular array, the plurality of seal shoes comprising a first seal shoe, and the first seal shoe including a seal shoe base, a seal land and an aperture;
a seal base circumscribing the annular array;
a plurality of spring elements comprising a first spring element, the first spring element connecting and extending between the first seal shoe and the seal base; and
a secondary seal assembly configured to seal a gap between the seal base and the plurality of seal shoes, the secondary seal assembly comprising a secondary seal device;
wherein the seal shoe base extends axially along the axial centerline between a first end of the first seal shoe and a second end of the first seal shoe, the seal shoe base includes a first end portion, a second end portion and an intermediate portion axially between the first end portion and the second end portion;
wherein the first end portion shoe projects axially along the axial centerline out from the intermediate portion, in a direction away from the first spring element, beyond the secondary seal assembly to the first end of the first seal shoe;

wherein the second end portion projects axially along the axial centerline out from the intermediate portion to the second end of the first seal shoe;

wherein the seal land projects radially out from the intermediate portion in a direction away from the axial centerline;

wherein the aperture extends radially through the first end portion; and wherein the secondary seal device axially engages the seal land, and the secondary seal device is arranged axially between the seal land and the aperture.

12. The assembly of claim 11, wherein the first end portion further includes a second aperture; and the second aperture projects radially through the first end portion.

13. The assembly of claim 12, wherein the second aperture is located circumferentially next to the aperture.

* * * * *